United States Patent [19]
Lin

[11] Patent Number: 5,511,184
[45] Date of Patent: Apr. 23, 1996

[54] METHOD AND APPARATUS FOR PROTECTING A COMPUTER SYSTEM FROM COMPUTER VIRUSES

[75] Inventor: Pei-Hu Lin, Taipei Shyuan, Taiwan

[73] Assignee: Acer Incorporated, Taipei, Taiwan

[21] Appl. No.: 141,436

[22] Filed: Oct. 22, 1993

Related U.S. Application Data

[63] Continuation of Ser. No. 689,018, Apr. 22, 1991, abandoned.

[51] Int. Cl.$^6$ .................................................. G06F 11/00
[52] U.S. Cl. ........................... 395/734; 395/700; 380/4; 371/67.1
[58] Field of Search .................... 395/700, 600, 395/575; 380/4, 25; 371/21.1

[56] References Cited

U.S. PATENT DOCUMENTS

| | | | |
|---|---|---|---|
| 4,118,789 | 10/1978 | Casto et al. | 364/184 |
| 4,663,707 | 5/1987 | Dawson | 364/200 |
| 4,780,905 | 10/1988 | Cruts et al. | 380/44 |
| 4,975,950 | 12/1990 | Lentz | 380/4 |
| 4,982,430 | 1/1991 | Frezza et al. | 380/50 |
| 5,012,514 | 4/1991 | Renton | 380/4 |
| 5,050,212 | 9/1991 | Dyson | 380/25 |
| 5,086,502 | 2/1992 | Malcolm | 395/575 |
| 5,121,345 | 6/1992 | Lentz | 364/550 |
| 5,144,660 | 9/1992 | Rose | 380/4 |
| 5,161,122 | 11/1992 | Robertson | 365/195 |
| 5,168,555 | 12/1992 | Byers et al. | 395/325 |
| 5,204,966 | 4/1993 | Wittenberg et al. | 395/800 |
| 5,210,875 | 5/1993 | Bealkowski et al. | 395/700 |
| 5,247,659 | 9/1993 | Curran et al. | 395/575 |
| 5,278,973 | 1/1994 | O'Brien et al. | 395/500 |

OTHER PUBLICATIONS

Powis, "Progams to Fight Viruses", *Tech PC User*, vol. 1, No. 9, May 1989, pp. 31–33.

*Primary Examiner*—Thomas G. Black
*Assistant Examiner*—Hosain T. Alam
*Attorney, Agent, or Firm*—Townsend and Townsend and Crew

[57] ABSTRACT

An apparatus and method for protection against attack by computer virus. Detection and prevention of a virus attack at boot time is achieved by write-protecting the storage devices of the system before the booting process and by detecting the presence of virus by checking integrity of the interrupt vectors of the system. Similar checks may be run on the system modules, device drivers, and application programs, using, for example, a checksum to insure that no further viruses are present in those programs.

10 Claims, 3 Drawing Sheets

METHOD AND APPARATUS FOR PROTECTING A COMPUTER SYSTEM FROM COMPUTER VIRUSES

This is a continuation of application Ser. No. 07/689,018, filed Apr. 22, 1991, now abandoned.

BACKGROUND OF THE INVENTION

1. Field of the Invention

The present invention relates to a method and apparatus for protecting a computer system against vandalism commonly known as computer viruses.

2. Description of the Related Art

As the world becomes more and more computerized, one of the great concerns of the data processing industry has been possible attacks on a computer system by viruses. In less serious cases, an attack by a computer virus may force an organization to replicate or recover data and files before it can resume normal operation. In more serious cases, data and files destroyed by a virus may become unrecoverable, forever shutting down the organization's operation. In the most serious cases, the integrity of an organization's data bases may have been attacked without warning, and the organization continues operation using inaccurate data, resulting in injuries, losses and damages.

The virus problem is aggravated because typical computer viruses are, like biological viruses, capable of self-replication, and computers can be infected through connection to networks. Viruses can also attach themselves to application and/or system programs. Moreover, a relatively harmless virus may undergo "mutation" (modified during its residence in a computer system) to become a fatal one.

One common way which viruses attack a computer system is by changing the interrupt vectors in the system so that the virus can affect the operation of the system and the I/O devices. Therefore, one prior art anti-virus method sets hooks on interrupt vectors and interrupt program instructions in order to detect attempts by a virus to change the interrupt vectors.

In another prior art anti-virus method, programs to be executed in the system first undergo a self-test to detect whether the program has been modified. If a program has been modified, it may have been infected and execution of the program in the system is inhibited.

In yet another prior art anti-virus method, predefined characteristics (e.g., a check sum) of each program in its uninfected state are stored. Before a program is executed, these characteristics are regenerated and compared with their corresponding stored counterparts to determine whether it has been modified.

However, these prior art methods are unsatisfactory for three reasons. First, the operation of these prior art method requires assistance of the computer's operating system (e.g., DOS). Since the operating system can only function after successfully booting the computer system, these prior art methods cannot protect the computer from viruses that attack when a computer system boots, i.e., before installation of the operating system. Second, the prior art is unable to prevent viruses which bypass the operating system and operate directly on the hardware or the BIOS. Third, existing anti-virus systems cannot prevent viruses which reside in the operating system modules (e.g., IO.SYS, MSDOS.SYS, and COMMAND.COM).

Therefore, there is a need for a method and apparatus for protecting computer systems against viruses, not only by preventing viruses from entering into a computer system, but also by removing and disabling a virus that already resides in the computer system. Also, there is a need for protection from viruses during the period when the systems boots up.

SUMMARY OF THE INVENTION

The preferred embodiment of the present invention for protecting a computer system from viruses comprises means for inhibiting before booting of the system, storage of data into storage devices of the computer system, means for checking integrity of programs already loaded into the system, and means responsive to checking means for enabling storage of data into the storage devices if the programs loaded into the system are free from virus.

The preferred embodiment of the present invention further comprises means for ensuring that programs to be loaded and executed in the computer system are free from virus, and means for removing viruses that may reside in the system.

DETAILED DESCRIPTION OF THE PREFERRED EMBODIMENT

Figure 1:
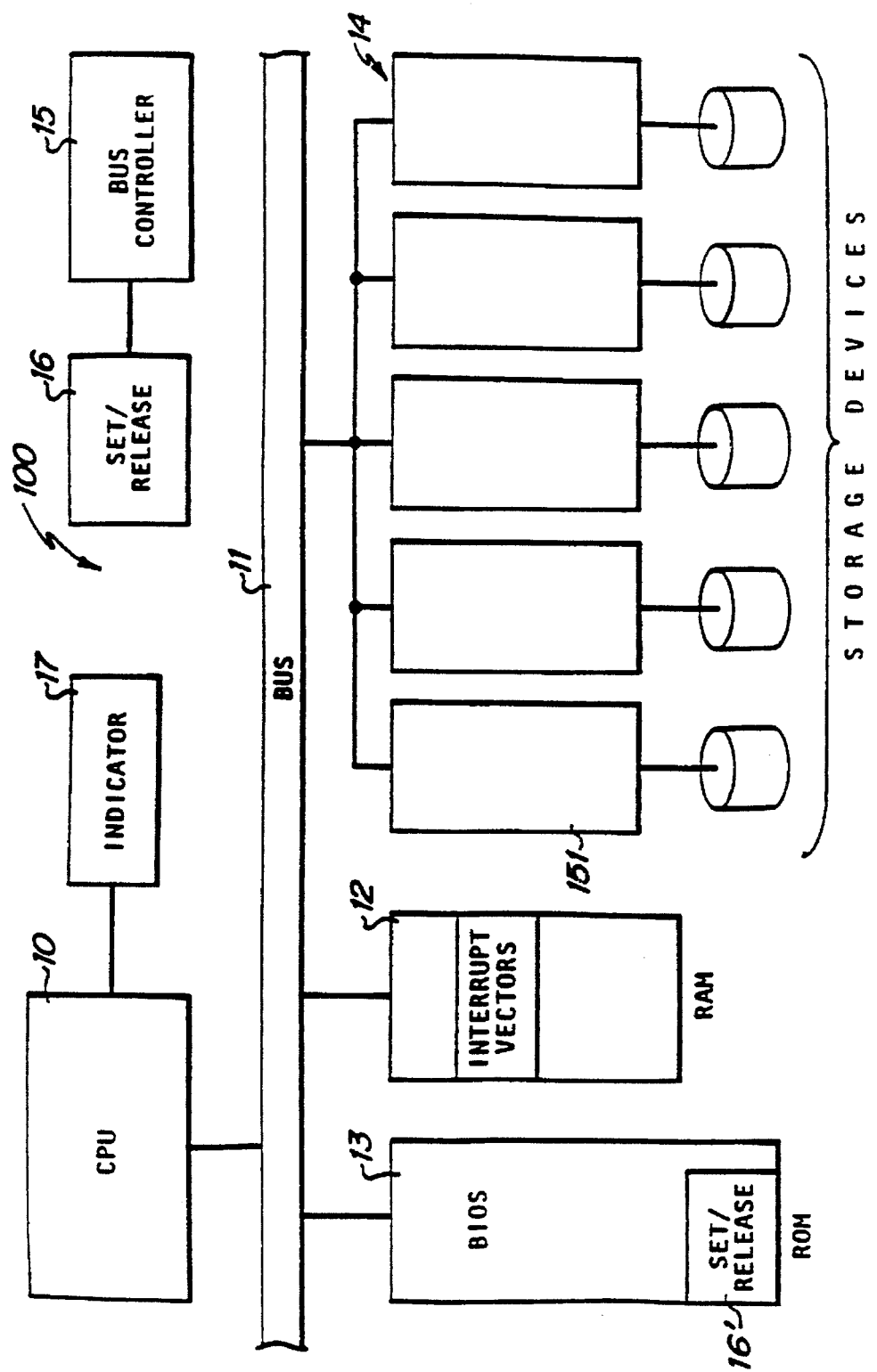
FIG. 1 is a block diagram illustrating a computer system wherein the present invention is embodied.

FIG. 1 is a block diagram of a typical computer system 100 including the preferred embodiment of the present invention. The computer system 100 comprises a CPU 10 which interacts through bus 11 with its other components, including a Random Access Memory (RAM) 12, a Read Only Memory (ROM) 13 and a plurality of input/output (I/O) devices. These I/O devices 14 include basic devices such as data storage devices (e.g., floppy disks or hard disks), keyboard (not shown) and monitors (not shown). The I/O devices 14 may also include one or more called installable (optional) devices such as a tape or a CD-ROM device (not shown).

One of the storage devices 14 may be used to load a book program at initialization (such as at power on). When so used, such storage device 14 is also called a booting device.

The ROM 13 contains software instructions commonly known as the Basic Input/Output System (BIOS) for performing interface operations with the I/O devices 14 of the computer system 100. Also stored in the ROM 13 is a software routine which operates to load a boot program from the booting device. The boot program will typically be executed when the computer system 100 is powered on or when initialization of the system is needed.

As typical with most of today's computer system, the I/O devices 14 communicate with the CPU 10 by generating interrupts. The CPU 10 distinguishes interrupts from among the I/O devices 14 through individual interrupt codes assigned thereto. Responses of the CPU 10 to I/O device interrupts differ, depending, among other things, on the devices 14 generating the interrupts. Interrupt vectors are provided to direct the CPU 10 to different interrupt handling routines. For example, in many of today's personal computers, two hundred and fifty six such interrupt vectors are provided.

The interrupt vectors are generated during initialization (or Boot) of the computer system 100 by execution of the BIOS. Because responses of the CPU 10 to device interrupts may need to be changed from time to time, the interrupt vectors may need to be modified from time to time so as to be able to direct the CPU 10 to different interrupt handling routines. To allow modification of the interrupt vectors, they are stored in the RAM 12 during operation of the computer system 100.

To increase efficiency and user friendliness, most computer systems typically are controlled by an operating system program (e.g., Microsoft's Disk Operating System, MSDOS). An operating system comprises modules for driving the basic I/O devices (such as the IO.SYS) and controlling other system control modules (e.g., MSDOS). In addition, the operating system may include a command interpreter (such as COMMAND.COM in MS DOS) for interpreting commands entered by a user.

Figure 2:
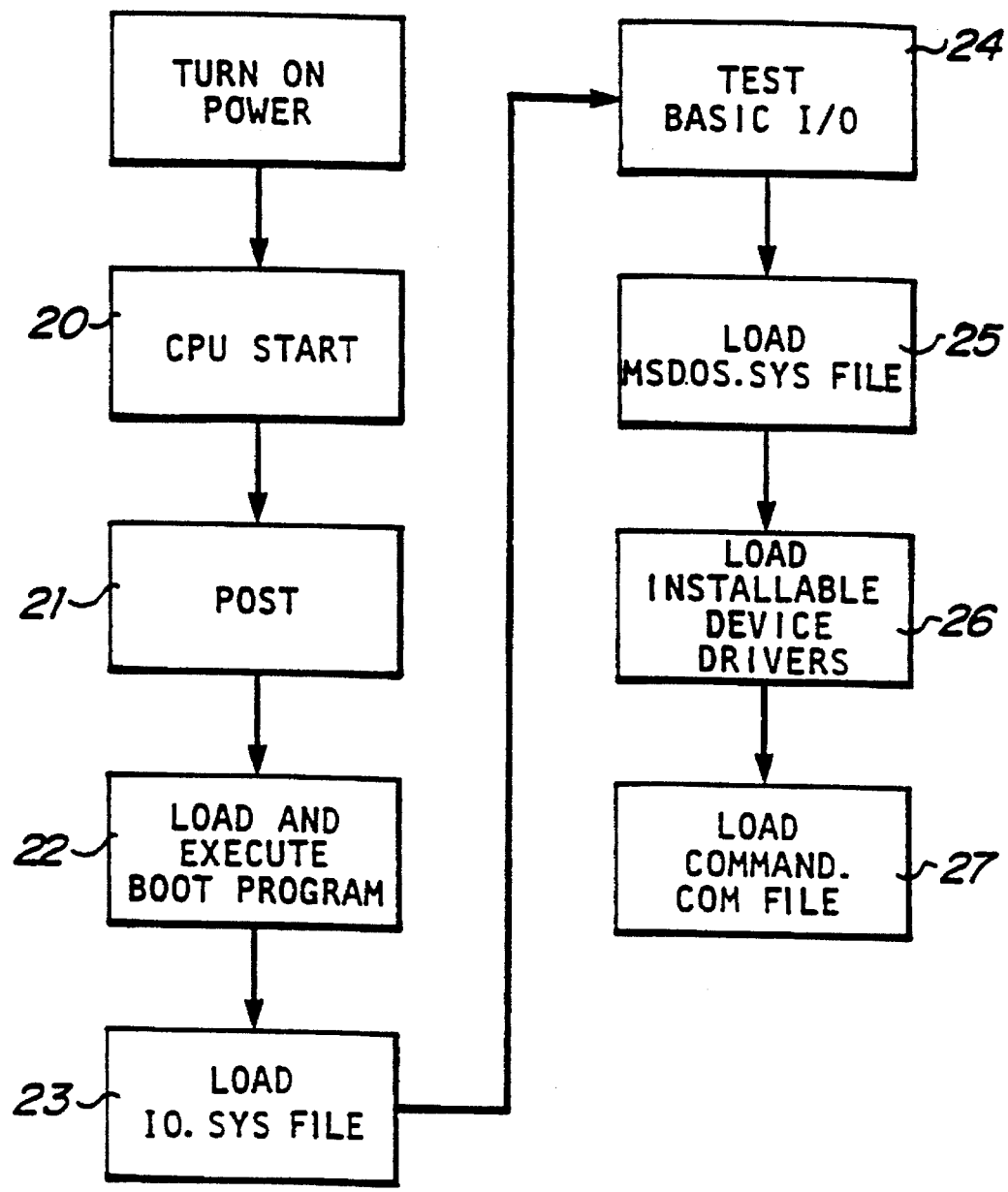
FIG. 2 is a flow diagram illustrating the typical power on operation of a computer system.

Referring now to FIG. 2, the prior art initialization process is illustrated. When power to the computer system 100 is turned on (block 20), CPU 10 typically first performs a power-on self test ("POST") (block 21) stored as part of the BIOS in the ROM 13. If there is no error in the POST, a boot program will be loaded into the computer system 100 (block 22) from the booting device. When the boot program executes without error, the operating system module (IO.SYS) will be loaded (block 23). This operating system module is a software driver for the basic I/O devices 14. The basic I/O devices 14 are then tested (block 24). Next, the core of the operating system (MSDOS.SYS) (block 25), the software drivers for the installable devices (block 26), and the command interpreter (COMMAND.COM) (block 27) are loaded and executed in succession.

After completion of the above-mentioned procedure, the booting operation is considered finished and the computer system is ready for normal operation. It can then receive commands from a user, whose commands may include the loading and execution of one or more application programs.

Computer viruses commonly in existence may be classified into: (1) Boot Time Infection Virus, (2) Program Infection Virus and (3) System Infection Virus.

Boot Time Infection Viruses typically affect a computer system by replacing the boot program with a virus program at boot time to control the system. To explain how this virus steals control of the computer system, the normal booting procedure is explained first.

If the computer system 100 is booted from a booting device that is infected with a virus (such as when an infected floppy diskette is inserted into a floppy disk drive), the virus alters one or more interrupt vectors (for example, the disk storage interrupt vector) during the booting procedure so that they will point to a virus program. The computer system 100 perceives the virus program as a portion of the BIOS. Thus, the virus program can steal control of the interrupt handling process for disk access. When the user accesses data from the disk, for example, the virus program can copy itself into the disk. Though the computer appears to operate normally, the disk in the computer system has already been infected.

Program Infection Viruses typically reside in application programs. They typically attack the computer system during execution of the application program by modifying the interrupt vectors so as to cause the system to execute a virus program.

System Infection Viruses typically reside in the operating system program (such as the IO.SYS, MS DOS.SYS). They attack the system during the booting process.

Figure 3:
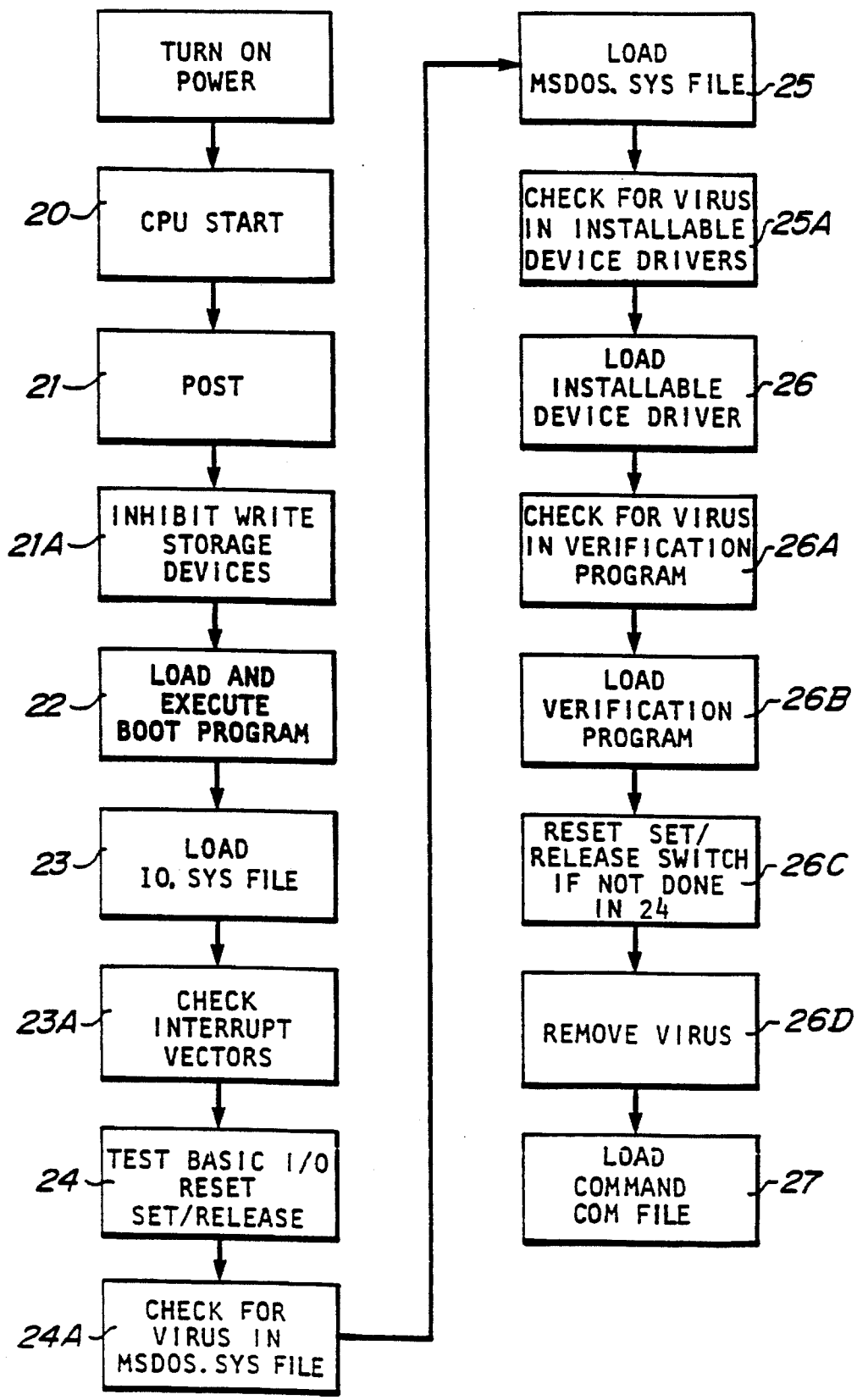
FIG. 3 is a block diagram of the preferred embodiment of the virus prevention system of the present invention.

FIG. 3 is a flow chart of a system initialization process similar to that shown in FIG. 2. However, the process is improved to incorporate the present invention.

First, the system power is turned on and the CPU starts in step 20. At system power-on, if the POST (block 21) executes without error, the booting program would normally be loaded into the computer system 100 from the booting devices (block 22).

In accordance with the present invention, before the booting program is loaded and executed (block 22), a set/release switch 16 is set to inhibit writing to the storage devices 14 (block 21A). In other words, the setting of the set/release switch 16 would allow only retrieval of data from the storage devices (read-only) 14.

Methods for inhibiting storage of data into a particular storage device can be performed in several different ways. For example, since the bus controller 15 of the computer system 100 screens all I/O operations passing through the bus 11, it can, responsive to the setting of the set/release switch 16, reject write operations to designated I/O devices 14.

Alternatively, the set/release switch 16' may reside in the BIOS stored in ROM 13. Since all I/O operations are performed by execution of the BIOS, the BIOS can be implemented so that setting of the set/release switch 16' effectively causes the BIOS to ignore write instructions to certain devices.

Advantageously, the setting of the set/release switch 16 should only inhibit writes to non-volatile storage devices 14 (as compared to volatile storage devices), since integrity of content these devices need to be preserved.

By setting the set/release switch 16, a virus cannot attack the data or programs in the storage devices 14 at boot time.

Although the flow chart shows the setting of the set/release switch 16 right before booting of the computer system 100, it will be understood by those skilled in the art that the switch 16 can be set (to inhibit write operations) at any point in time before the system boots. By way of example, the set/release may be set by the system power-on signal.

After the set/release switch 16 is set, the computer system 100 can begin loading and executing the boot program and software drivers for the basic devices (blocks 22 and 23).

After these programs are loaded and executed, the computer system 100 will check to see if it has been attacked by a virus (Block 23A). This is done by comparing the interrupt vectors already loaded into RAM 12 against their corresponding normal (uninfected) values. The normal (uninfected) values of the interrupt vectors can be stored in any one of the storage devices 14.

Alternatively, since default values of the interrupt vectors typically point to the address range of the BIOS, the comparison may only check whether the value of a vector falls within such an appropriate range.

It will be understood by those skilled in the art that, depending on a cost/effectiveness tradeoff, only one or a particular set of interrupt vectors needs to be checked. For example, since most boot time infection viruses use the interrupt vectors of the monitor, it may be sufficient for the purpose of this invention to only check whether such interrupt vectors have been altered.

If the value of an interrupt vector has been changed, the computer system 100 will take appropriate corrective actions, such as producing a signal to notify the user that the booting program has been infected with a virus (block 2). In accordance with the preferred embodiment of the present invention, a virus indicator 17 is provided in one of the non-volatile storing devices. When the system discovers a virus in the booting program, the virus indicator 17 will be set to inform the user that the booting device is infected. The virus indicator 17 is also stored in a non-volatile storage device.

If the interrupt vectors have not been contaminated, power on operation of the computer system will continue with the loading of the system driver (MSDOS.SYS) (block 25) and the installable device driver (block 26). In accordance with the preferred embodiment, however, each such program will be loaded only after it is determined that no virus resides therein (blocks 24A and 25A).

As an alternative implementation, a copy of the booting program in its uninfected state, can be stored in the computer system 100, either in a ROM 13 or in the non-volatile storage devices 14. This copy can be used to compare the boot program from the booting device before the booting.

According to the preferred embodiment, although several program modules (MSDOS.SYS, installable device drivers and COMMAND.COM) still need to be loaded, since means are provided to check the integrity of these programs before they are loaded, the set/release switch 16 or 16' can be reset at this time (step 24) if the interrupt vectors in the RAM 12 are not altered. If such means are not provided, the set/release switch 16 or 16' may be reset near the end of the power on process in step 26C.

In the preferred embodiment, a check sum for each of the system modules (MSDOS.SYS and installable device drivers) in their uninfected states is stored. Before each of these modules is loaded and executed, the corresponding check sum is calculated and compared with stored values to determine whether any of the operating system modules are infected. If the comparison shows no alterations, the system will load the programs and proceed normally. Otherwise, a warning signal and the virus indicator 17 are set to inform the user to replace the booting device.

The power-on procedure is now almost completed and the CPU 10 is ready to work. However, to protect the system from file-type (or program-type) viruses, a verification program is provided in the preferred environment for preventing program-type virus from entering into the computer system. (Blocks 26A and 26B). The verification program requires a user give the system a specific characteristic (e.g., check sum) of each application program in its uninfected state.

The system will check the characteristic of an application program against the characteristic given in step 26B. Only if such characteristic matches will the program be allowed to execute.

In accordance with another preferred embodiment of the present invention, a virus removing means is also provided. The virus clearing program will remove viruses detected at the above steps. The virus removing means stores a good copy of the booting program, the operating system modules and the installable device drivers. If a virus was detected in a previous booting process, the good copy of the program will be copied from the nonvolatile read-only storage means over the bad copy that was used in the previous booting process. It should be understood by those skilled in the art that one of the above described virus detection methods may also be used to detect the presence of viruses in the verification program and the removing program virus.

The protection system of the present invention eliminates drawbacks of virus prevention during the booting procedure. The protection system controls the booting procedure to exactly and efficiently prevent the system from being contaminated with computer virus. Furthermore, the preferred embodiment of the prevention system prevents damage from program-type virus and provides a virus-clear means. Such efficiency is unattainable by an conventional prevention system. Thus, the prevention system of the present invention provides comprehensive protection from damage caused by computer viruses.

Of course, it is understood that the above is merely a preferred embodiment of the invention and that various changes and alterations can be made without departing from the true spirit and broader aspects thereof.

What is claimed is:

1. A computing system which is protected against a virus, the system having a boot loading means for loading a boot program into the system from a storage means, wherein the storage means contains a first plurality of interrupt vectors which are sent to the system prior to loading the boot program, the system comprising:

a read-only memory for storing a first program;

first program executing means for executing the first program when the system is turned on and prior to loading said boot program, said first program comprising:

vector generating means for generating a second plurality of interrupt vectors;

vector comparing means for comparing said first plurality of interrupt vectors to said second plurality of interrupt vectors; and signaling means for generating a first signal if said first plurality of interrupt vectors is equivalent to said second plurality of interrupt vectors, and for generating a second signal if said first plurality of interrupt vectors is not equivalent to said second plurality of interrupt vectors;

boot program executing means for executing the boot program after the first program executing means executes the first program and only upon receipt of said first signal;

vector generating means for generating a third plurality of interrupt vectors;

vector comparing means for comparing said first plurality of interrupt vectors to said third plurality of interrupt vectors;

signalling means for generating a third signal if said first plurality of interrupt vectors is equivalent to said third plurality of interrupt vectors, and for generating a fourth signal if said first plurality of interrupt vectors is not equivalent to said third plurality of interrupt vectors; and write control means for controlling writes into the storage means, the write control means including write preventing means for preventing writes to the storage means until said third signal is received.

2. The computer system according to claim 1 further comprising:

driver loading means for loading an I/O driver program into the system only after receipt of said third signal;

driver program executing means for executing the I/O driver program after the boot program executing means executes the boot program;

vector generating means for generating a fourth plurality of interrupt vectors;

vector comparing means for comparing said first plurality of interrupt vectors to said fourth plurality of interrupt vectors;

signalling means for generating a fifth signal if said first plurality of interrupt vectors is equivalent to said fourth plurality of interrupt vectors, and for generating a sixth signal if said first plurality of interrupt vectors is not equivalent to said fourth plurality of interrupt vectors; and wherein the write preventing means includes means for preventing writes into the storage means while the I/O driver program is executing and until said fifth signal is received.

3. The computer system according to claim 1, wherein said information includes a normal system driver checksum for a system driver program, said computer system further comprising:

system driver loading means for loading the system driver program into the system only after receipt of said third signal;

system driver program executing means for executing the system driver program after the boot program executing means executes the boot program;

checksum calculating means for calculating a calculated system driver checksum from the system driver program;

checksum comparing means for comparing the normal system driver checksum to the calculated system driver checksum;

signalling means for generating a fifth signal if said normal system driver checksum is the same as the calculated system driver checksum, and for generating a sixth signal if said normal system driver checksum is different from the calculated system driver checksum; and wherein the system driver loading means prevents the loading of the system driver into the system until said fifth signal is received.

4. The computer system according to claim 3, wherein said information includes a normal installable device driver checksum for an installable device driver program, said computer system further comprising:

installable device driver loading means for loading the installable device driver program into the system only after receipt of said fifth signal;

checksum calculating means for calculating a calculated installable device driver checksum from the installable device driver program;

checksum comparing means for comparing the normal installable device driver checksum to the calculated installable device driver checksum;

signalling means for generating a seventh signal if said normal installable device driver checksum is the same as the calculated installable device driver checksum, and for generating a eighth signal if said normal installable device driver checksum is different from the calculated installable device driver checksum; and wherein the installable device driver loading means prevents the loading of the installable device driver into the system until said seventh signal is received.

5. The computer system according to claim 1, wherein said information includes a user-defined check value for a second program, said second program separate from said first program and separate from said boot program, the computer system further comprising:

program loading means for loading the second program into the system;

check value calculating means for calculating a program check value from the second program;

check value comparing means for comparing the user-defined check value to the calculated check value;

signalling means for generating a fifth signal if said user-defined check value is equivalent to the calculated check value, and for generating a sixth signal if said user-defined check value is not equivalent to the calculated check value; and wherein the program loading means prevents the loading of the second program into the system until said fifth signal is received.

6. A method for protecting a computing system against a virus, the system having a means for inputting a booting program into the system from a storage means, wherein the storage means contains a first plurality of interrupt vectors which are sent to the system prior to loading the botting program, the method comprising the steps of:

storing a first program in a read-only memory;

executing the first program when the system is turned on, said executing step comprising the steps of;

generating a second plurality of interrupt vectors;

comparing said first plurality of interrupt vectors to said second plurality of interrupt vectors prior to loading said boot program into the system;

generating a first signal if said first plurality of interrupt vectors is equivalent to said second plurality of interrupt vectors, and generating a second signal if said first plurality of interrupt vectors is not equivalent to said second plurality of interrupt vectors;

loading said boot program into the system, the boot program being stored in the storage means;

executing the boot program after the first program is executed and upon receipt of the first signal;

generating a third plurality of interrupt vectors;

comparing said first plurality of interrupt vectors to said third plurality of interrupt vectors;

generating a third signal if said first plurality of interrupt vectors is equivalent to said third plurality of interrupt vectors, and generating a fourth signal if said first plurality of interrupt vectors is not equivalent to said third plurality of interrupt vectors; and preventing writes to the storage means until said third signal is received.

7. The method according to claim 6 further comprising the steps of:

loading an I/O driver program into the system only after receipt of said third signal;

executing the I/O driver program after executing the boot program;

generating a fourth plurality of interrupt vectors;

comparing said first plurality of interrupt vectors to said fourth plurality of interrupt vectors;

generating a fifth signal if said first plurality of interrupt vectors is equivalent to said fourth plurality of interrupt vectors, and generating a sixth signal if said first plurality of interrupt vectors is not equivalent to said fourth plurality of interrupt vectors; and wherein the write preventing step comprises the step of preventing writes into the storage means while the I/O driver program is executing and until said fifth signal is received.

8. The method according to claim 6, wherein said storage means includes a normal system driver checksum for a system driver program, said method further comprising the steps of:

calculating a calculated system driver checksum from the system driver program;

comparing said normal system driver checksum to the calculated system driver checksum;

generating a fifth signal if said normal system driver checksum is the same as the calculated system driver checksum, and generating a sixth signal if said normal system driver checksum is different from the calculated system driver checksum; and preventing the loading of the system driver program into the system if a sixth signal is received.

9. The method according to claim 8, wherein said storage means includes a normal installable device driver checksum for an installable device driver program, said method further comprising the steps of:

calculating a calculated installable device driver checksum from the installable device driver program;

comparing said normal installable device driver checksum to the calculated installable device driver checksum;

generating a seventh signal if said normal installable device driver checksum is the same as the calculated installable device driver checksum, and generating a eighth signal if said normal installable device driver checksum is different from the calculated installable device driver checksum; and preventing the loading of the installable device driver program into the system if an eighth signal is received.

10. The method according to claim 6 further comprising the steps of:

storing a user-defined check value for a second program into said storage means, said second program separate from said first program and separate from said boot program;

checking said second program, said checking comprising the steps of:

calculating a program check value for the second program;

comparing the user-defined check value to the calculated check value;

generating a fifth signal if said user-defined check value is equivalent to said calculated check value, and generating a sixth signal if said user-defined check value is not equivalent to said calculated check value; and preventing the loading of the second program into the system if a sixth signal is received.

* * * * *